Figure 1:
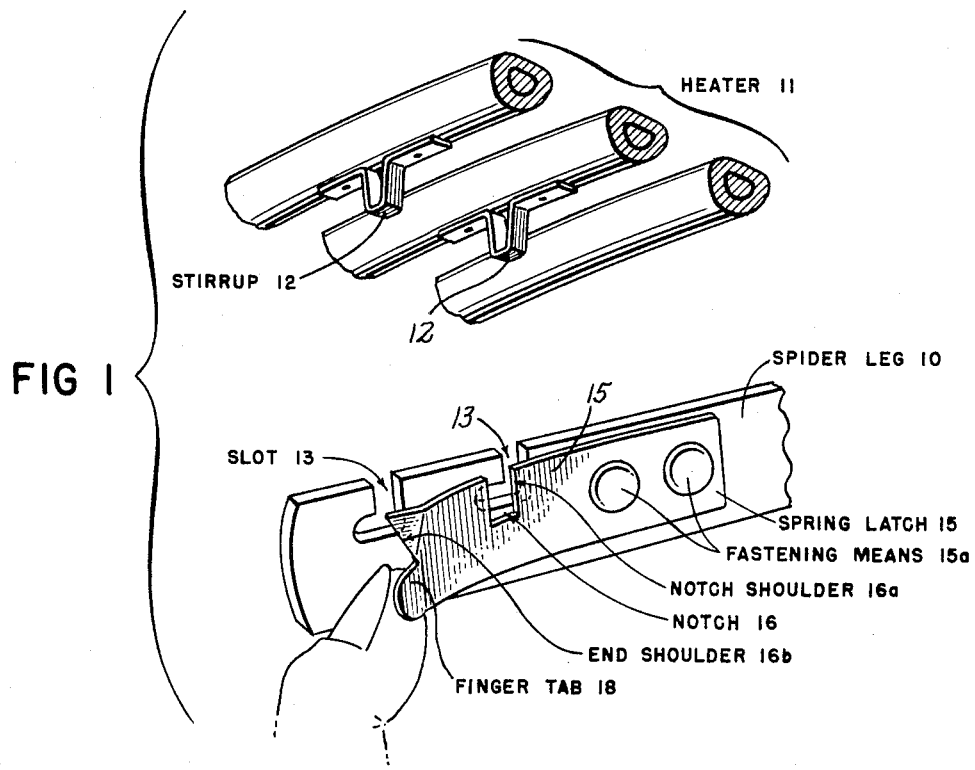

Feb. 15, 1966  B. ALTMAN ETAL  3,235,710
REPLACEABLE HEATER

Filed Nov. 1, 1963  2 Sheets-Sheet 1

INVENTORS
Bernard Altman
Paul Stiller
BY
James C. Ledbetter
ATTORNEY

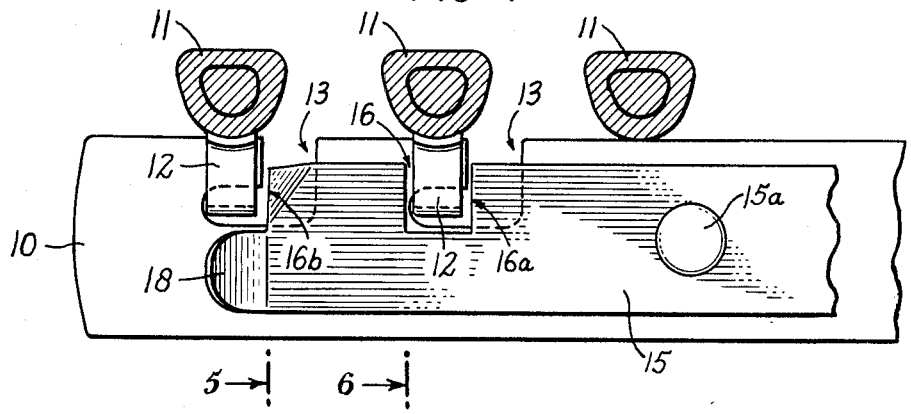
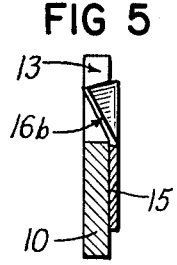
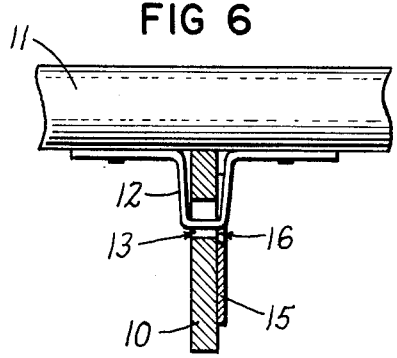
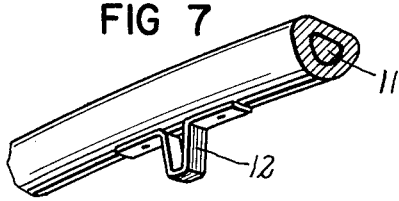
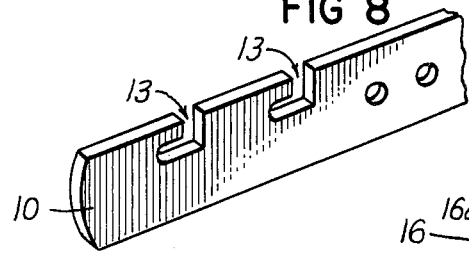
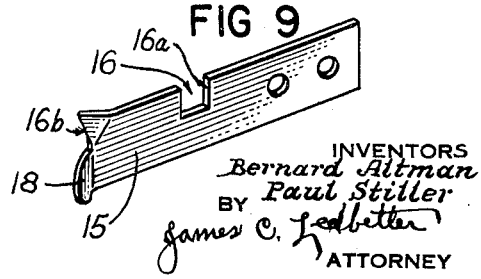

United States Patent Office 3,235,710
Patented Feb. 15, 1966

3,235,710
REPLACEABLE HEATER
Bernard Altman, Rye, and Paul Stiller, Scarsdale, N.Y., assignors to Still-Man Manufacturing Corp., New York, N.Y., a corporation of New York
Substituted for abandoned application Ser. No. 173,165, Feb. 14, 1962. This application Nov. 1, 1963, Ser. No. 321,998
2 Claims. (Cl. 219—463)

This invention relates to sheathed or clad (tubular) type electrical heaters for range tops, known as surface heaters and, more particularly, to an improved Replaceable Heater for an electrical range top (cooking platform), as distinguished from a range oven heater. This is a substitute application for Ser. No. 173,165, filed February 14, 1962, now abandoned.

Conventional heaters for range tops comprise a spider (support) on which a tubular heating element is mounted, thus two main structural metal parts. The spider consists of an underneath multi-leg horizontal supporting frame. The heating element resting upon it is usually a spiral or convolute tubular sheath, which encloses an insulated coiled electrical resistance hot wire, for raising the sheath to cooking temperature. Suitable "holding means" fasten these two main parts together.

The earlier "holding means" in the art provided a permanent (fixed) attachment between the two main parts, as by a weld or other non-separable joint means. Accordingly, a burned-out heating element was not conveniently replaceable. Later in the art, there were holding means which provided for the removal of the old heating element and its replacement with a new one, but the use of a tool and a service mechanic were usually required.

Then followed the present day "holding means" which is entirely manually operated and, therefore, does not require the use of a tool. The instant invention is believed to simplify present day practice, by providing a positive lock-in holding device, which renders the assembly rugged and permanent against loosening of its two main parts.

The instant holding means also facilitates initial assembly at the factory of the heating element and supporting spider. It just as readily permits the heating element per se (after long use) to be removed from its spider and a new heating element replaced thereon—all without the use of tools and, moreover, having an added lock-in feature—thus a manually-operable holding means of new form, as aforesaid, for replaceable surface heaters.

It is, therefore, a purpose of this invention to improve conventional manually-operated holding means, by providing a new device, which retains a clad heating element on its supporting spider, and which introduces a new and simple locking or latching feature, made a part of the spider frame, for release and removal of a burned-out heating element and its replacement by a new one, both operations being manually performed by a new mode of action.

The accompanying illustrations show one example of the invention. They were made from a commercial specimen heater, on an enlarged scale for clarity. The front portion of the heater is shown, i.e., the circular portion thereof located toward the front working side of the cooking platform of an electric range.

The first three figures demonstrate "action," i.e., the parts are in a state of manipulation (whether being assembled or disassembled). The last five figures are "still" views.

Note that FIG. 1 illustrates the two main parts of the surface heater being handled, either being separated or put together. For example, the heating element per se is being detached from one or more retaining slots formed in the spider support. Two retaining slots are shown. One's hand (or thumb) has flexed a leaf spring latch, which unlocks the old spent clad heating element from its spider leg, and said element has been easily removed for replacement by a new one, as in the next two views.

Figures 2, 3:
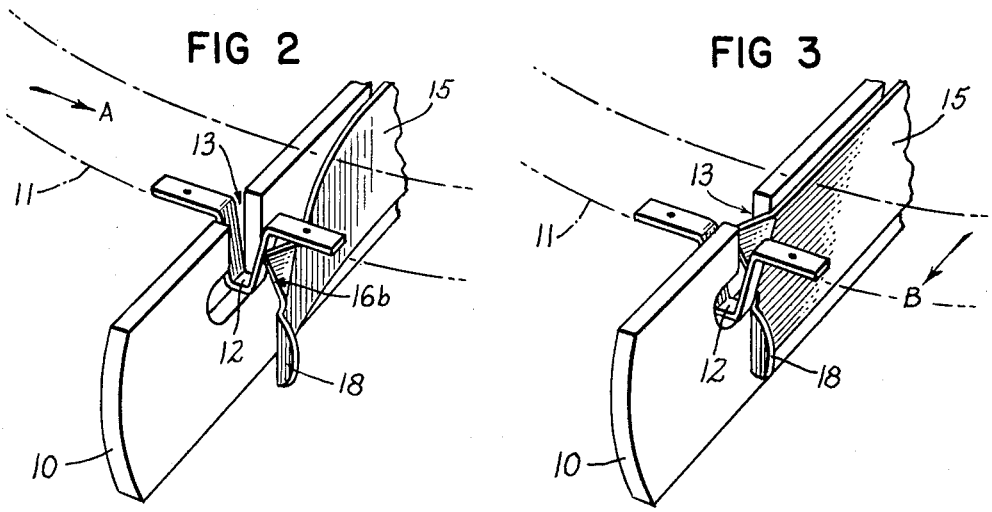

Only one retaining slot is shown in FIGS. 2 and 3, but it is sufficient to illustrate the inventive concept. Note that the two arrows A and B demonstrate action and direction of movement, i.e., the manual assembly of the two parts, either initially at the factory, or as a subsequent replacement of a burned-out heating element for a new one.

Specifically, FIG. 2 shows the heating element (dot-dash lines) being initially manually pushed longitudinally, i.e., perpendicular to the aforementioned spider leg (in the direction of arrow A) and against an angular end shoulder on the spring latch, flexing it, and thus making ready for the final latching-in movement of said heating element, next view.

Particularly, the action view, FIG. 3, completes the manual operation started in FIG. 2. Note that the heating element is locked in final position, by having pushed it radially, i.e., parallel to the aforesaid spider leg (in the direction of arrow B), which is at right angles to arrow A in FIG. 2. The spring latch (its aforementioned angular end shoulder) now rests in positive locking position.

As shown, FIG. 4 is a side view of the heating element in final locked position on its spider, after the two assembly movements in action views (FIGS. 2 and 3) have been performed, also after the spring latch has automatically returned to its locked position as in FIG. 3.

Note that FIG. 5 is an important cross sectional view, on the line 5 of FIG. 4, showing the aforementioned angular end shoulder at locking-rest position in a retaining slot of the spider leg.

Next, FIG. 6 is a detail view on the line 6 of FIG. 4, showing a holding stirrup attached (say spot welded) to the bottom side of the heating element sheath and its relationship to the spider support and spring latch. Incidentally, two stirrups and two spider slots (the commercial form) are provided for in FIGS. 1, 4, 8 and 9. Nevertheless, FIGS. 2 and 3 emphasize the inventive concept, a new mode of operation being shown by the action arrows A and B, whether for one stirrup and one slot, or for a pair of each.

As to FIG. 7, it is a detail view of a stirrup attached, i.e., fixed (spot welded) on the bottom surface of the heater sheath, without showing the spider.

In FIG. 8, there is shown a detail of the front portion of a leg of the spider frame, showing two L-shaped or J-shaped slot means, adapted to receive the aforesaid pair (FIGS. 1 and 4) of stirrups. The slot and stirrup means are conventional features and may be referred to as holding means, improved herein by a new mode of convenience arising out of the positive latch-in leaf spring, as first shown (thumb flexed) in FIG. 1.

Finally, FIG. 9 is a detached detail of the spring latch, first shown in FIG. 1, which locks the stirrup or stirrups, to thus removably fix the heating element in its operative assembly upon the supporting spider. This flat leaf spring "holding device," of characteristic form, constitutes one of the main features of the invention.

*Detail description of the foregoing illustrative drawings*

As an example of the invention, it is seen that a heating-element supporting-frame called, for short in the trade, a spider leg 10, is shown in horizontal position. This spider (support leg) consists of a conventional steel bar of thin form, set upright (edgewise), upon the top edge of which rests a well-known sheathed or tubular heater, marked in the drawings as a heater 11.

The holding means herein, for replaceably fastening the heating element 11 on the spider leg 10, comprises one or more stirrups 12 fixed (spot welded) on the underneath side of the heater sheath 11. These stirrups 12 fit into the one or more retaining slots 13 formed in the upper part of the spider leg 10. The stirrup or stirrups 12 and the slot or slots 13 fit together, thus holding the two parts of the assembly in operative relation and, although conventional, are easily and conveniently assembled and disassembled, by reason of the improvements herein.

Note also that the slot or slots 13 are oversize in relation to the dimensions of the one or more stirrups 12 and, thereby, provide a lost motion joint (retention means) between the two different metallic parts (spider 10 and heating element 11). This conventional arrangement provides for expansion and contraction, relatively, between these two different metallic parts having unlike coefficients of expansion and contraction, as shown in the prior art, for example, in expired Wiegand 1,706,017.

Next, a single elongated flat leaf spring, comprising a device in the form of a spring latch 15, has a permanent fastening (anchorage) means 15a, spot welded or riveted at its rear end for fixing it flatwise (face to face) on one vertical side of the horizontal spider leg 10. This spring latch lies across and partially covers one side of the slot means 13.

The linearly flat spring latch 15 is provided with an upward notch 16, having a rear upright notch shoulder edge 16a. Similarly, the forward end of the spring latch 15 also has an upward angular end shoulder edge 16b. These two shoulders 16a and 16b are disposed, respectively, adjacent to or coincident with the front upright edge of the spider leg slots 13. Thus, the notch shoulder 16a and end shoulder 16b (one of them or both) coact with the stirrup or stirrups 12, when the latter are in the slots 13, to releasably retain the heating element 11 in horizontally seated position on the spider leg 10.

The notch shoulder 16a and/or the angular end shoulder 16b loosely coact with (abut with lost motion) the rear edge or edges of the stirrup or stirrups 12 to latch them, with slight play, within the horizontal portion of one or both oversize L-slots 13 formed in the spider leg 10.

Either one of the two or more spider leg slots 13 performs the same holding function as the other or others. This is equally true of the two spring latch shoulder edges 16a and 16b. Thus, a single spring latch 15 may be adapted to loosely retain one, two, or more spiral heater (multi-) convolutes on the spider leg and also provide for contraction and expansion between these two parts 10 and 11.

It is important to observe the exemplary characteristics of the angular set of the front end shoulder 16b. Note that it comprises the upper front corner of the spring latch 15, that it is deformed inward at an angle to the plane of the spider leg 10, and is disposed within the front slot 13. Its purpose is to prevent the stirrup 12 (when sliding rearward in the horizontal portion of slot 13) from becoming wedged between the front end of the spring latch 15 and the spider leg 10.

From the foregoing, the previous description of action views (FIGS. 2 and 3) is further appreciated, in that the FIG. 2 direction arrow A represents the manual motion longitudinally imparted to the stirrup or stirrups 12, when they are inserted into one of the L-slots 13 and deflect the front end of the spring latch 15 away from the spider leg 10. Then follows the action of the arrow B, showing the stirrup 12 sliding radially forward into the horizontal portion of the L-slot 13.

Note that the front end angular shoulder 16b acts to loosely but positively latch against the rear edge of the front stirrup 12 (FIG. 3) and locks it in position within the spider slot 13. Likewise, the rear notch shoulder 16a serves to loosely and positively latch against the rearmost stirrup (the one at the right in FIGS. 1 and 4) and similarly locks it in position.

Accordingly, it is seen from FIGS. 2 and 3 that a single receiving L-slot (one only) may be sufficient. However, the holding means (two slots 13 and two stirrups 12 in other views) constitute features of the heater, as manufactured for the trade. The snap-back action of the flat leaf spring latch 15 (when manually released, FIG. 1) not only causes its width and breadth to overlie and close the one or more spider slots 13, but also acts to loosely abut the rear edge of the one or more stirrups, thereby positively locking them in the slots.

Finally, it is observed that the forward end of the spring latch 15 has a bent-outward thumb or finger tab 18, adjacent and under the front end angular shoulder 16b. Its utility is illustrated in FIG. 1, where one's finger grasps this tab 18 and flexes the front end of the leaf spring latch 15 to the right, and away from the spider leg, thereby releasing the one stirrup 12 (FIGS. 2 and 3) or the two stirrups 12 (shown in other views) from their latched-in position. This manipulation permits the old heater 11 (if and when burned out) to be conveniently removed and a new heater to be installed.

To complete the removal of the heating element 11 from the spider 10 of the range top, it is merely required that the electrical wiring connections (not shown) of the heating element be disconnected.

This replaceable heater device is of simple form. It is believed to supply a need felt by electric heater manufacturers, as well as by the electric range manufacturing trade and its customers, i.e., the ultimate users of modern electric ranges.

What is claimed is:

1. (a) In a surface-type electric heater for ranges and the like, having a horizontal spider leg, supporting the convolutes of a sheathed heating element, also a holding device securing these two said parts in operative assembly in a known way; said holding device including a stirrup means fixed on the underside of said sheath, with slot means provided within and opening upward through the top edge of said spider leg, and into which the stirrup means is received and held; said holding device having the known facility of being manually operable to receive and release said heating element onto and from the spider leg;

(b) that improvement over the aforesaid conventional holding means, which consists of an elongated and linearly flat leaf spring holding device, in the form of a spring latch, having its rear end fixed against a side of said spider leg;

(c) the front end portion of the spring latch being flexibly free, overlying and closing said slot means, a finger tab formed on the flexibly free front end of the spring latch, adapting its front end portion to be flexed manually away from said spider leg by finger pressure, thus uncovering and opening said slot means, for receiving and releasing said stirrup means;

(d) the flexibly free front end portion of the spring latch having a shoulder means, which loosely abuts the stirrup means, and locks it loosely in said slot means, when and after the flexibly free end is manually released and snaps back against said spider leg, thus covering and closing said slot means;

(e) whereby the initial assembly of the aforesaid two parts, also the subsequent disassembly and replacement of said heating element on said spider leg are readily performed, by manual operation of the spring latch carried on the spider leg, without the use of a tool.

2 (a) A surface-type electrical heater as described in claim 1, but having specific features as follows:
   (b) a shoulder means, as at 16b in the drawings, formed within the linearly flat spring latch, and being disposed coincident with said slot means of said spider leg;
   (c) this shoulder means being deformed, i.e., bent inwardly, at an angle to the plane of said spider leg, and thus positioned angularly within said slot means;
   (d) the angular shoulder means being at rest within said slot means, when the spring latch is in normal latching position against said spider leg, and thus disposed behind said stirrup means, preventing said stirrup means from becoming displaced from said slot means, and also preventing said stirrup means from becoming wedged in between the spring latch and said spider leg.

References Cited by the Examiner

UNITED STATES PATENTS

| | | | |
|---|---|---|---|
| 2,654,825 | 10/1953 | Cunningham | 219—463 |
| 2,881,302 | 4/1959 | Ammerman | 219—463 |

RICHARD M. WOOD, *Primary Examiner.*

ANTHONY BARTIS, *Examiner.*